United States Patent Office 3,644,614
Patented Feb. 22, 1972

3,644,614
ULTRAVIOLET RADIATION PROTECTION COMPOSITION, CONTAINING A MIXTURE OF CINNAMIC ACID ESTERS
Benno Streschnak, Krefeld, and Willy Doll, Quelle, Germany, assignors to Haarmann & Reimer Gesellschaft mit beschrankter Haftung, Holzminden, Germany
No Drawing. Filed Dec. 8, 1969, Ser. No. 833,360
Claims priority, application Germany, Sept. 5, 1969, P 19 45 054.5
Int. Cl. A61l 23/00; A61k 7/00
U.S. Cl. 424—60    2 Claims

ABSTRACT OF THE DISCLOSURE

A composition highly useful for the protection human skin against absorption of ultraviolet radiation; the composition being a mixture of 4-methoxy cinnamic acid isopropyl ester and at least one ester from the group consisting of
4-isopropyl cinnamic acid ethyl ester;
4-isopropyl cinnamic acid methyl ester; and
2,4-diisopropyl cinnamic acid methyl ester; and
2,4-diisopropyl cinnamic acid ethyl ester.

This invention relates to a mixture of certain cinnamic acid esters for use as agents to protect human skin against the harmful effects of ultraviolet radiation.

Radiation protective agents for the human skin are supposed to absorb as completely as possible the erythema causing rays with wavelengths of about 285–320 millimicrons, but letting through the longer waved rays desired for the pigmentation of the skin. The cinnamic acid esters used hitherto as a radiation protective agent do not fulfill this requirement to the full extent. Unsubstituted cinnamic acid alkyl esters have an extinction maximum which lies below 280 millimicrons, that is to say its extinction decreases with an increasing wavelengths, so that rays with a wavelength of 310 millimicrons are let through practically without hindrance. Alkyl esters of the 4-methoxy cinnamic acid have an extinction at 307–308 millimicrons and show a good protective effect. In comparison the radiation protective agents of this invention distinguish themselves by having a broader absorption band, which therefore, makes them suitable for special uses, for example, protection against light in high mountains or the light from mercury vapor discharge lamps.

According to the present invention a superior agent for protecting human skin against the harmful effects of absorbing ultraviolet radiation is provided by a composition comprising a mixture of 4-methoxy cinnamic acid isopropyl ester and at least one ester from the group consisting of 4-isopropyl cinnamic acid methyl ester, 4-isopropyl cinnamic acid ethyl ester, 2,4-diisopropyl cinnamic acid methyl ester, and 2,4-diisopropyl cinnamic acid ethyl ester. It is preferred for such a composition to contain approximately 70%–90% by weight of 4-methoxy cinnamic acid isopropyl ester and about 10%–30% by weight of any one or more of the other four cinnamic acid esters mentioned above. Most preferred is the latter composition wherein among the four cinnamic acid esters one or both of the 4-isopropyl cinnamic acid esters comprise 10%–30% by weight of the composition and one or both of the 2,4-diisopropyl cinnamic acid esters comprise 0–30% by weight of the composition. The mixture of substituted cinnamic acid esters according to the invention may be added to customary preparations, for example, preparations in the nature of an oil, an alcohol-containing base, or a cream. Generally speaking, it will be sufficient if the preparations contain about 1–6% by weight of the mixture of substituted cinnamic acid esters in accordance with the invention.

The mixture are compatible and completely non-irritating to the human skin, even in the case of frequent use.

The cinnamic acid ester components employed in the compositions of this invention are either well-known compounds or can easily be prepared by relatively uncomplicated chemical procedures.

(a) 4-isopropyl cinnamic acid ethyl ester as well as 4-methoxy cinnamic acid isopropyl ester are known compounds.

(b) 4-isopropyl cinnamic acid methyl ester can be obtained by reaction of 4-isopropyl benzaldehyde with acetic acid methyl ester in the presence of sodium or sodium methylate at 0–20° C.

(c) 2,4-diisopropyl cinnamic acid methyl ester or ethyl ester can be produced in an analogous manner by the condensation of 2,4-diisopropyl benzaldehyde with acetic acid methyl ester or ethyl ester in the presence of sodium or sodium methylate or ethylate at 0–60° C.

(d) Mixtures of the methyl esters and ethyl esters of 4-isopropyl cinnamic acid and 2,4-diisopropyl cinnamic acid can be obtained by the reaction of a mixture of cuminaldehyde and 2,4-diisopropyl benzaldehyde with ethyl acetate and sodium methylate. This latter mixture of aldehydes can be obtained from cumene by the Gattermann-Koch synthesis.

The pertinent properties of the various cinnamic acid esters are listed in Table 1.

TABLE 1

| | Boiling point, ° C./mm. Hg | Density, $d_4^{20}$ | Refractive index, $n_D^{20}$ | Milli-microns | Extinction, $E_{1\%}^{1cm.}$ (in methanol) |
|---|---|---|---|---|---|
| I. 2,4-diisopropyl cinnamic acid methyl ester | 132/2 | 0.990 | 1.5447 | 289 | 775 |
| II. 2,4-diisopropyl cinnamic acid ethyl ester | 138/2 | 0.977 | 1.5377 | 289 | 740 |
| III. 4-isopropyl cinnamic acid methyl ester | 120/2 | 1.023 | 1.5582 | 286 | 1,195 |
| IV. 4-isopropyl cinnamic acid ethyl ester | 126/2 | 1.001 | 1.5492 | 286 | 1,125 |
| V. 4-methoxy cinnamic acid isopropyl ester | 130/1 | ($Ep=20°$) | | 308 | 1,120 |

The following operating examples are intended to illustrate certain embodiments of this invention without limiting it in any manner whatsoever. Parts and percentages are by weight and temperatures in degrees centigrade unless otherwise specified.

EXAMPLE 1

This example illustrates the preparation of the compounds employed in the composition of this invention.

(a) 4-isopropyl cinnamic acid methyl ester.—130 g. of sodium methylate are added over a period of two hours at 15°–20° C. to a mixture of 300 g. of cuminaldehyde, 500 g. methyl acetate and 400 g. toluene. After an additional two hours the mixture is acidified with acetic acid, washed with an aqueous solution of sodium chloride and distilled. The fraction at 118°–125° C./2 mm. Hg is purified by redistillation. The yield of product is 312 g., it has a boiling point at 2 mm. Hg of 120° C., its density ($d_4^{20}$) is 1.023, and its refractive index ($n_d^{20}$) is 1.5582. The product is 4-isopropyl cinamic acid methyl ester.

(b) 2,4-diisopropyl cinnamic acid ethyl ester.—350 g. sodium ethylate are introduced in portions into a mixture of 800 g. 2,4-diisopropyl benzaldehyde, 1200 g. ethyl acetate and 800 g. toluene over a period of three hours while the temperature is not permitted to rise above 20° C. After an additional three hours the mixture is acidified with acetic acid, washed with water and distilled. The fraction at 135°–145° C./2 mm. Hg is redistilled. The yield of the final product is 820 g., it has a boiling point at 2 mm. Hg of 138° C., it has a density ($d_4^{20}$) of 0.977, and it has a refractive index ($n_d^{20}$) of 1.5377. The product is 2,4-diisopropyl cinnamic acid ethyl ester.

(c) 2,4-diisopropyl cinnamic acid methyl ester.—The preparation as described above in paragraph (b) is repeated with the exception that 1000 g. methyl acetate is used in place of ethyl acetate and 280 g. sodium methylate instead of sodium ethylate. The yield of the final product is 750 g., it has a boiling point at 2 mm. Hg of 132° C., it has a density of ($d_4^{20}$) of 0.990, and it has a refractive index ($n_d^{20}$) of 1.5477. The product is 2,4-diisopropyl cinnamic acid methyl ester.

(d) Mixed esters.—The preparation as described above in paragraph (b) is repeated with the exception 2,4-diisopropyl benzaldehyde, 800 g. of a mixture of approximately 88% of 2,4-diisopropylbenzaldehyde and 12% cuminaldehyde are used in place of 2,4-diisopropylbenzaldehyde and 280 g. sodium methylate are used in place of sodium ethylate.

The fraction at 120°–140° C./2 mm. Hg was analyzed by gas chromatographic means and found to have the approximate composition:

| | Percent |
|---|---|
| 2,4-diisopropyl cinnamic acid ethyl ester | 60 |
| 2,4-diisopropyl cinnamic acid methyl ester | 28 |
| 4-isopropyl cinnamic acid ethyl ester | 8 |
| 4-isopropyl cinnamic acid methyl ester | 4 |

EXAMPLE 2

This example demonstrates the extinction characteristics of various compositions of this invention.

Mixtures and their extinction curves

Mixture A:  Percent
- 4-methoxy cinnamic acid isopropyl ester _____ 75
- 2,4-diisopropyl cinnamic acid ethyl ester _____ 25

Mixture B:
- 4-methoxy cinnamic acid isopropyl ester _____ 85
- 4-isopropyl cinnamic acid methyl ester _____ 15

Mixture C:
- 4-methoxy cinnamic acid isopropyl ester _____ 75
- Ester mixture according to Examples 1, 4 _____ 25

In the attached graph the extinctions of mixtures A, B and C are given, wherein $R_1$ is the wavelength where the maximum effects of erythema are produced by ultraviolet radiation at an even intensity.

$R_2$ is the wavelength where the maximum effects of erythema are produced by sunlight.

Extinction properties of various compositions of this invention are shown in Table 2.

TABLE 2

Extinction of Selected Compositions

| Composition | Milli-microns | $E_{1\%}^{1cm.}$ (in methanol) | | | |
|---|---|---|---|---|---|
| | | 297 | 300 | 305 | 308 |
| Mixture A, Example 2 | 304/306 | 940 | 945 | 950 | 945 |
| 25% III, 75% V (Table 1) | 296 | 990 | 980 | 970 | 945 |
| Mixture B, Example 2 | 300/306 | 1,000 | 1,005 | 1,005 | 1,000 |
| Mixture C, Example 2 | 304/308 | 945 | 950 | 960 | 960 |

EXAMPLE 3

This example shows typical preparations employing the compositions of this invention for a radiation protective agent.

(a) Cream for protection against light:

| | G. |
|---|---|
| Oleic acid decyl ester | 5.0 |
| Silicon oil | 3.0 |
| Acetylated lanolin | 2.0 |
| Glycerol monostearate | 12.5 |
| Mixture A, Example 2 | 2.0 |
| Water | 70.5 |
| Sorbitol solution 70% | 5.0 |

When this preparation is mixed with a perfumed oil and a preservative it provides an excellent protection against the harmful effects of ultra violet radiation when applied to the human skin.

(b) Cream for protection against light:

| | G. |
|---|---|
| Isopropyl myristate | 3.0 |
| Paraffinum subliquidum | 20.0 |
| Mixture B, Example 2 | 2.5 |
| Sorbitol-sesquioleate | 5.0 |
| Distilled water | 66.0 |
| Glycerol | 3.0 |
| Pure crystalline magnesium sulfate | 0.5 |

When this preparation is mixed with a perfumed oil and a preservative it provides an excellent protection against the harmful effects of ultra violet radiation when applied to the human skin.

(c) Oil for protection against light:

| | G. |
|---|---|
| Peanut oil, stabilized | 25.0 |
| Isopropyl myristate | 5.0 |
| Paraffinum perliquidum | 57.0 |
| Oleic acid decyl ester | 10.0 |
| Mixture C, Example 2 | 3.0 |

When this preparation is mixed with a perfumed oil and applied to the human skin it provides an excellent protection against the harmful effects of ultraviolet radiation.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A composition for the protection of human skin against absorption of ultraviolet radiation comprising a mixture of about 70–90% by weight of 4-methoxy cinnamic acid isopropyl ester, about 10 to 30% by weight of at least one ester selected from the group consisting of 4-isopropyl cinnamic acid methyl ester, and 4-isopropyl cinnamic acid ethyl ester and about 0 to 30% by weight of at least one ester selected from the group consisting of 2,4-diisopropyl cinnamic acid methyl ester and 2,4-diisopropyl cinnamic acid ethyl ester.

2. The composition of claim 1 present in 1 to 6% by weight in a carrier selected from the group consisting of oil and cream.

References Cited

UNITED STATES PATENTS 3,390,051   6/1968   Baker et al. _____ 424—60

OTHER REFERENCES

Schneider et al., Chemical Abstracts, 1955, p. 8490.

Römpp Chemie Lexikon, 1966, pp. 5934, 5935, 5936, 5937, 5938, 5943, 5944.

Deutsches Arnzei Buch, 1968, pp. 759 to 761.

STANLEY J. FRIEDMAN, Primary Examiner

D. R. ORE, Assistant Examiner